United States Patent
Roese

[11] 3,821,466
[45] June 28, 1974

[54] LIQUID CRYSTAL STEREOSCOPIC TELEVISION SYSTEM

[76] Inventor: John A. Roese, 6315 Camino Corto, San Diego, Calif. 92120

[22] Filed: May 25, 1973

[21] Appl. No.: 364,212

[52] U.S. Cl............. 178/6.5, 178/DIG. 1, 350/150, 350/160 LC, 352/63
[51] Int. Cl. .............................................. H04n 9/54
[58] Field of Search ........ 178/6.5, DIG. 1; 350/150, 350/160 LC; 352/63

[56] References Cited
UNITED STATES PATENTS

| | | | |
|---|---|---|---|
| 2,433,971 | 1/1948 | Adams | 178/6.8 |
| 3,536,921 | 10/1970 | Caulfield | 250/199 |
| 3,701,121 | 10/1972 | Fraser | 340/173.2 |
| 3,737,567 | 6/1973 | Kratomi | 178/6.5 |

OTHER PUBLICATIONS
Stereotronics Corporation, "Convert Your Industrial Television to 3D–TV.... In Minutes" Copyright 1961.

*Primary Examiner*—Robert L. Griffin
*Assistant Examiner*—Edward L. Coles
*Attorney, Agent, or Firm*—Richard S. Sciascia; Ervin F. Johnston; William T. Skeer

[57] ABSTRACT

An underwater viewing system is mounted on a submarine vehicle and includes a stereoscopic viewing system. The stereoscopic viewing system comprises a single camera having a full-frame beam-splitter which is equipped with electro-optical light valves. The remote viewing station provides a full-frame alternate-image readout for the stereoscopic viewing system and is provided with a head-worn stereoscopic analyzer having electro-optical light valves which are synchronized with those on camera.

12 Claims, 4 Drawing Figures

3,821,466

3,821,466

LIQUID CRYSTAL STEREOSCOPIC TELEVISION SYSTEM

STATEMENT OF GOVERNMENT INTEREST

The invention described herein may be manufactured and used by or for the Government of the United States of America for governmental purposes without the payment of any royalties thereon or therefor.

FIELD OF INVENTION

This invention pertains to the field of marine engineering and optical instrumentation. More particularly, the invention pertains to a viewing system to be used with underwater observation vehicles. In the greater particularity, the invention pertains to a stereoscopic viewing system employing alternate frames for the left and right stereoscopic images. In still greater particularity, the invention pertains to a stereoscopic viewing system for use on underwater observation vehicles employing electro-optical shutters in a stereoscopic system.

DESCRIPTION OF THE PRIOR ART

As man masters his ocean environment, the ability to examine objects submerged beneath the sea becomes increasingly important. For example, it is frequently desirable for a ship's operational personnel to visually inspect the exterior of the hull of the ship below the water line. This inspection may be useful to determine the condition of the outer surfaces of the vessel as well as to locate and analyze mechanical defects in the ship's operational equipment. In the past, the only methods available to facilitate such visual inspection has been to either remove the ship from the water, a costly and time consuming operation which may be performed in limited areas, or to employ divers to go beneath the surface of the water and visually inspect the hull. The former arrangement requires that the ship be in port and entails an extended period of time. The latter operation has become important in recent times due to the increased availability of self-contained underwater breathing apparatus, scuba gear. However, inspection by divers requires moderate temperatures, relatively calm water, and conditions affording good visibility.

There are many times when these ideal conditions permitting diver inspections to be performed do not occur for several days and, in polar climates, may never permit extensive diver time. Therefore, remote control inspection vehicles have been devised which permit such visual inspection to be accomplished via a telemetry linkage. However, such systems have been hampered with a lack of visual detail and contrast sufficient to obtain all of the information which may be desired. Considerable strides have been made in camera and light arrangements to minimize operational difficulties encountered with the prior art systems, however, improvement is still warranted.

SUMMARY OF THE INVENTION

The invention comprises a remotely controlled platform vehicle which carries a stereoscopic television camera together with an appropriate illumination system. The television camera employs an alternate-frame stereoscopic light valve which sequentially selects a left and right image path in response to the raster scan circuits of a remotely-located readout or recording system. The remotely controlled viewing system includes an operator-worn viewing system which also employs electro-optical shutters which are driven synchronously with the stereoscopic light valve mounted on the underwater camera. A hand held viewer is also an element of the system to permit casual inspection of the stereoscopic image by other than the full time operational personnel.

STATEMENT OF THE OBJECTS OF INVENTION

Accordingly, it is the object of this invention to provide an improved submarine inspection.

Another object of this invention is to provide a stereoscopic optical system which is uniquely adapted to underwater operation.

A further object of this invention is to provide a stereoscopic optical system which is adapted for operational support by a remotely controlled submarine vehicle.

A still further object of this invention is to provide an underwater oceanographic instrumentation system which employs a stereoscopic visual data link.

Yet another object of the present invention is to provide a submarine stereoscopic optical system employing electro-optical light valves as stereoscopic frame selection means.

A still further object of the present invention is to provide an underwater optical system which is adapted to be used by shipboard personnel to inspect the exterior of an ocean-going ship beneath the water line.

Yet another object of the present invention is to provide an underwater stereoscopic viewing system which may be deployed from a surface vessel to observe underwater subjects with stereoscopic imaging techniques.

These and other objects of the invention will become more readily apparent from the ensuing specification when taken together with the drawings.

DESCRIPTION OF THE PREFERRED EMBODIMENTS

Figure 1:
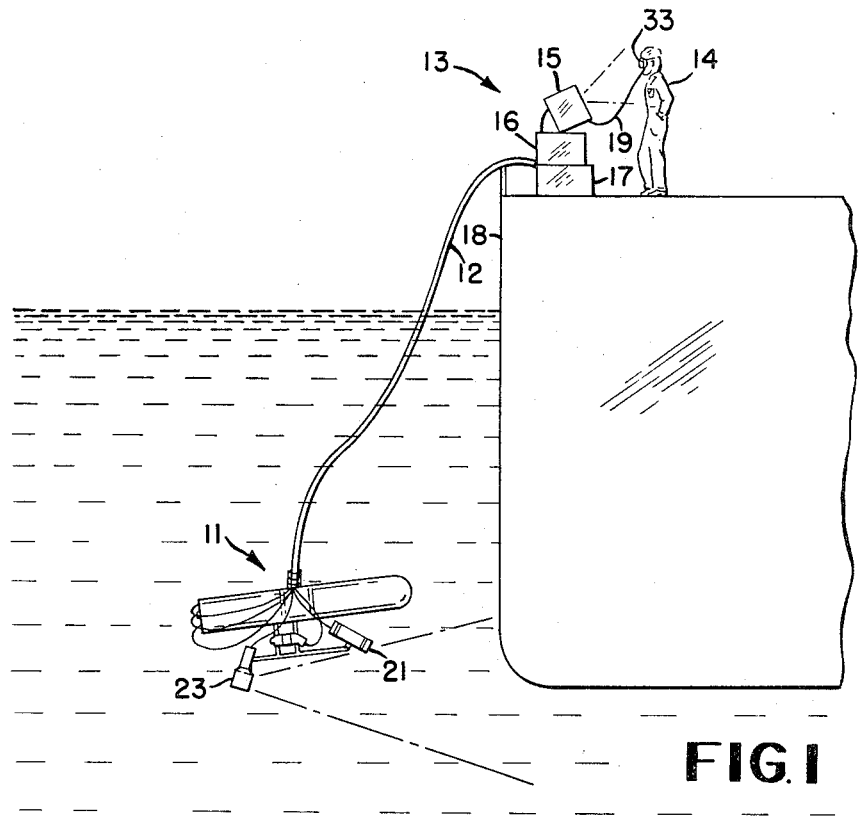
FIG. 1 is an illustration of the invention being used to inspect the hull of the surface of the vessel.

Referring to FIG. 1, a submarine vehicle, indicated generally at 11, is connected, via tether line 12, to a surface operating station, indicated generally at 13. Any suitable submarine vehicle capable of remote control and positioning, including those which operate untethered, may be used in the practice of the invention. However, for purposes of completeness and clarity, it should be noted that the vehicle disclosed in the co-pending application, Ser. No. 280,703 filed Aug. 14, 1972 by Ronald B. Fugitt et al. now U.S. Pat. No. 3,780,220 for Remote Control Underwater Observation Vehicle has proved satisfactory for use as submarine vehicle 11.

As shown, operating station 13 is configured to provide optimum operational convenience for an operator 14. That is, optical readout system 15, which in the instant invention is a stereoscopic system to be more completely described, permits operator 14 to control the submarine vehicle and inspect submarine objects in the vicinity thereof. A suitable electrical power supply 16 which, for purposes of explanation, may be considered to comprise electrical batteries, is mounted below the visual readout system 15. Power supply 16 rests upon a suitable hydraulic power supply 17. Of course, the particular construction of the various power supplies 16 and 17 will depend, to a considerable extent, on the specific power requirements of submarine vehicle 11 and the auxiliary instrumentation system carried thereby. Because the individual power supplies 16 and 17 do not form a critical part of the subject matter comprising the invention, a further description thereof is not believed warranted.

As shown, submarine vehicle 11 may be used to inspect the hull of ship 18, the operational platform, but other objects might be inspected, if desired. Likewise, in the illustrated embodiment operator 14 and control station 13 are located on an open deck of ship 18. Of course, they may be positioned in an enclosed compartment within ship 18, if desired. This enclosed operational position will ordinarily be the preferred arrangement.

As previously noted, hull inspection is but one function of the invention. Other marine applications may utilize the capabilities of the system of the invention as well. For example, submarine vehicle 11 may be used to provide visual inspection of a target indicated by sonar equipment, not shown, in order to ascertain the precise nature of the target. As will be recognized, this capability has particular utility in mine and submarine countermeasures and frees diver personnel from performing this hazardous duty. Still other applications will suggest themselves and submarine vehicle 11 may be used to replace swimmer divers in many applications and perform tasks normally performed by such personnel in environments where divers could not be deployed.

A television camera arrangement 21, carried by submarine vehicle 11, cooperates with a suitable illumination source 23 to provide a surface operator 14 with an image of the illuminated vicinity of submarine vehicle 11. Because camera arrangement 21, as will be more completely described, produces a stereoscopic image, the quality of the illumination is somewhat critical to obtain the maximum benefits of the system. Accordingly, illumination system 23 should be chosen as to enhance the contrast and for relief modeling available at the particular location and image. One such lighting system which has proven satisfactory for such operations is disclosed in copending patent application, Ser. No. 227,635 for Pan and Tilt Underwater Optical Viewing System with Adjustable Source-Receiver Separation and Zoom Lenses, filed on Feb. 18, 1972 by Clarence J. Funk now U.S. Pat. No. 3,757,042. If desired, other state of the art systems designed for illumination of underwater objects to enhance contrast may be employed.

As shown, operator 14 is wearing a stereoscopic analyzer 33 which is connected to TV monitor 15 via cable 19. This body-worn analyzer is a preferred arrangement to complete the viewing system of the invention.

As will be presently described, cable 19 is connected to suitable logic control circuitry to provide the left-right switching necessary for proper stereoscopic analysis.

Figure 2:
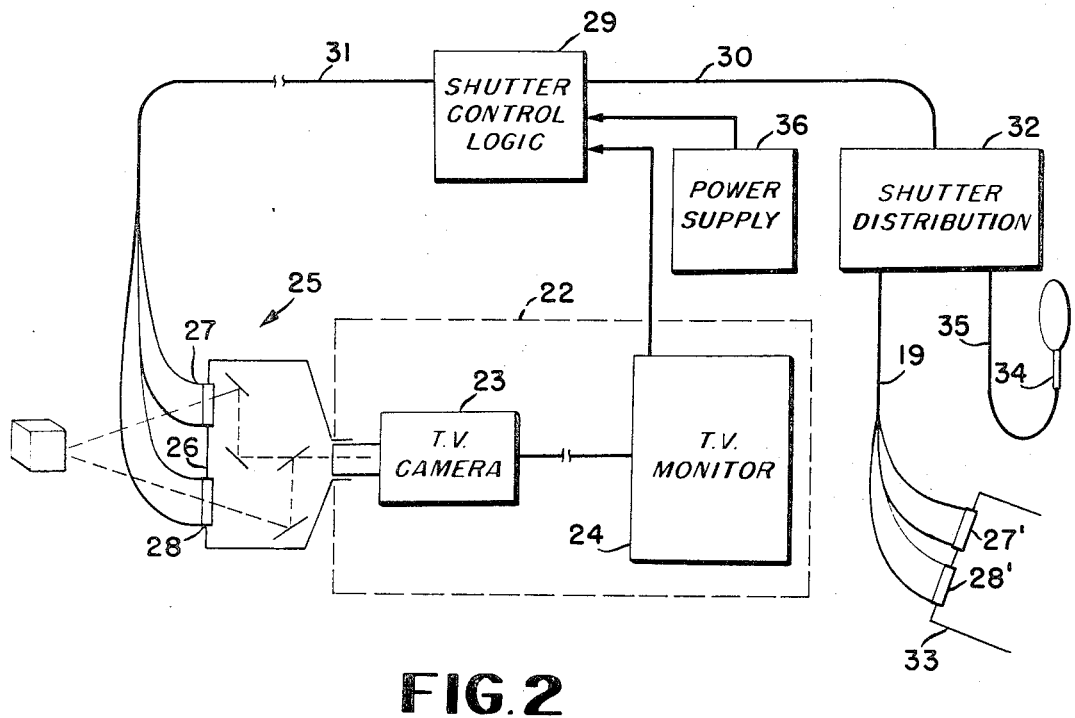
FIG. 2 is a diagrammatic presentation of the major components comprising the optical telemetry portion of the invention.

Referring to FIG. 2, the major components of the viewing system and their interconnection will be described. The heart of the viewing system of the invention comprises a state-of-the-art closed-circuit television system indicated generally at 22 and includes a TV camera 23 which is connected to the TV monitor 15 by means of a suitable interconnecting coaxial cable 24 which is included in tether 12, FIG. 1. Television camera 23 has a stereoscopic shutter arrangement indicated generally at 25 mounted on the forward part of the lens thereof. Camera 23 and stereoscopic beam splitter 25 together constitute the camera arrangement 21 illustrated in FIG. 1. The optical construction of beam-splitter 25 is conventional and employs a semitransparent mirror together with three front surface reflectors in the well known fashion to provide two converging optical paths.

Beam-splitter 25 may be fluid filled and pressure compensated to withstand changes in pressure as submarine vehicle 11 is caused to move through its range of operational depth. Of course, beam-splitter 25 is made of joined light-tight surfaces including a front wall 26.

Mounted in front wall 26 in operative position to occult the converging optical paths are suitable electro-optical light-valves 28 and 27. The particular construction of the light-valves will be more fully described later. Light-valves 27 and 28 derive their operational electrical potentials from a shutter logic circuit 29 which is connected to light-valves 27 and 28 via appropriate cabling 31. Cabling 31, like cable 24, may be included as a component part of tether 12 in the system illustrated in FIG. 1.

Shutter control logic circuit 29 alternately switches the operational potential derived from a power supply 36 to energize electro-optical light-valves 27 and 28. The particular operating potentials and the nature of the current supplied to the electro-optical light-valves 27 and 28 depends upon the particular nature of the valves. In one embodiment, liquid crystals are employed and in such an embodiment it has been found advantageous to use an alternating electrical current to energize the electro-optical light-valves. A more rapid switching time is possible with this type of current as opposed to direct current.

In such instances, power supply 36 may, if desired, be a portion of TV monitor 15. That is, an amplified output from the horizontal oscillator of the particular TV monitor may be advantageously employed with a corresponding reduction of independent circuitry. The output of shutter control logic circuit 29 is also coupled, via cable 30, to a shutter distribution circuit 32 which, in turn, is connected to the operator-worn stereoscopic analyzer 33 by means of a cable 19. This output energizes electro-optical light-valves 27' and 28' in synchronism with electro-optical light-valves 27 and 28 contained on a stereoscopic beam splitter 25.

A hand-held, lorgnette-type stereoscopic analyzer 34 is also illustrated as being connected to shutter distribution circuit 32 by means of an appropriate cable interconnection 35. The hand-held lorgnette may also include electro-optical light-valves, not shown. In such an embodiment, shutter distribution circuit 32 simply connects the individual light-valves in parallel with those of stereoscopic analyzer 33.

However, a less expensive version of lorgnette analyzer 34 may include a simple rotary shutter which alternately occults the left or right eye of the viewer to provide a stereoscopic analyzer.

If lorgnette analyzer 34 employs a mechanical shutter, the speed of an electrical drive motor operating the shutter may be controlled by a thumb operated control carried on the lorgnette such that shutter synchronism may be obtained for brief periods. The lorgnette analyzer 34 has proven useful in operational embodiments to provide temporary viewing of the stereogram by supervising personnel and others whose duties require only short duration inspection of a transmitted image.

Figure 3:
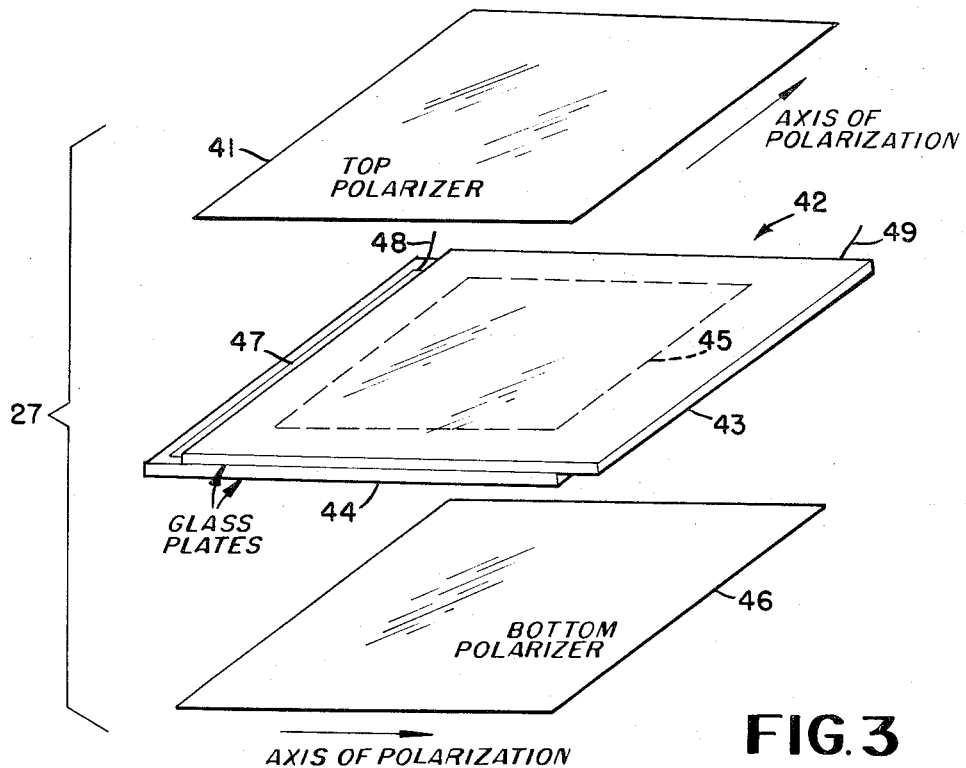
FIG. 3 is an exploded view of one of the electro-optical light valves used in the system.

Referring to FIG. 3, the details of the electro-optical light valves used in the invention is illustrated. As designated by the bracket, electro-optical light valve 27 is illustrated. Of course, this construction is representative of electro-optical light valves 28 and 27' and 28'. A top polarizer 41 is superposed over an active element 42 of the light valve. As shown, active element 42 includes an upper glass plate 43 and a lower glass plate 44. Glass plates 43 and 44 have a well in the center thereof and enclose an active element 45 therein. The bottom polarizer 46 is placed under bottom glass plate 44 and has its axis of polarization at a right angle to that of top polarizer 41. The surfaces of glass plates 43 and 44 are conductive and are connected via a conducting layer 47 to individual conductors 48 and 49.

The active element 45 of light valve 27 is a nematic liquid crystal. It should be noted that liquid crystals manufactured by the International Liquid Crystal Company of Kent, Ohio have proven satisfactory.

As will be readily understood by those familiar with the optics arts, a rapid switching time is a desirable parameter of performance for electro-optical light-valves used in a stereoscopic real-time viewing system. The aforementioned liquid crystals provide a satisfactory switching valve and are assembled such that the encapsulated active element 45 has a dimension of 2 × 2 inches and responds to a voltage applied to the conductors 48 and 49 such that with no voltage applied, the assemblage is opaqued. With a potential of 8 volts applied beteween the conductors 48 and 49 the liquid crystal rotates the polarization of the light passing therethrough by 90° such that light polarized by polarizer 41 is enabled to pass through bottom polarizer 46 and the system becomes transparent. The switching time is enhanced if, as a ground state, fluid crystal 45 has four volts applied thereto. Also, as noted above, an improved switching time is obtained when an alternating current voltage is applied.

Of course, there will be some light absorbed by polarizer 41 and 46 as well as the active element 45. However, transparency is closely approximated by the proper choice of materials. Polarizers designated as Type HN-22 or HN-32 manufactured by the Polaroid Corporation have proven satisfactory in developmental models.

As discussed above, satisfactory results are obtained when using nematic liquid crystals as the active element in stereoscopic beam splitter 25 and analyzer 33. However, other electro-optical light-valves may be used for the active elements in the invention if rapid switching time and high orders of transparency may be obtained. For example, some of the optically active electrically responsive ceramic materials may have utility in the system of the invention. One such substance which has shown considerable promise is lanthanum modified lead zirconate-titenate. In this regard, it should be noted that the switching time required to successfully operate in the underwater viewing system of the invention requires that the electro-optical light valve go from a clear to opaque in approximately 3 milliseconds transit time and provide in the order of 10 to 12 milliseconds viewing and occulting intervals. Such response times are clearly beyond those of which prior electro-optical light-valves were capable.

Figure 4:
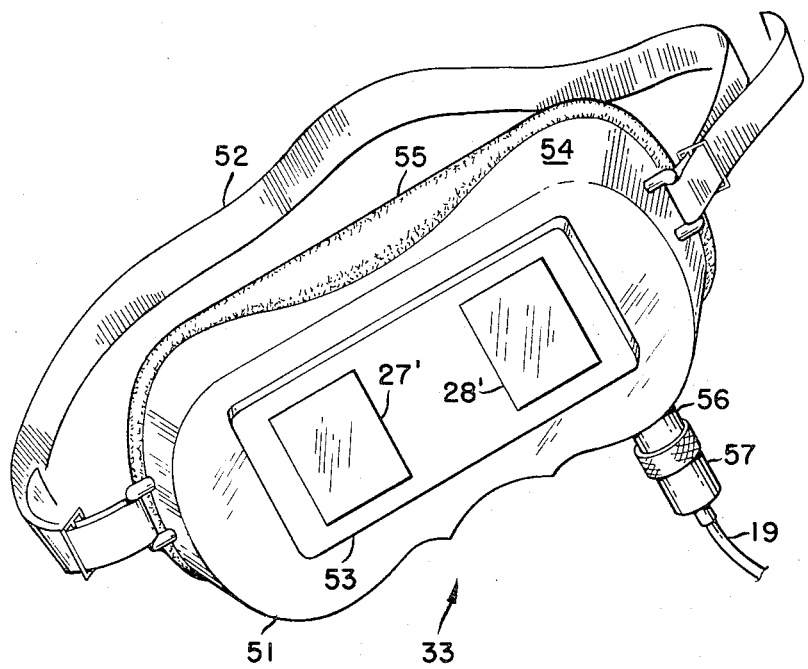
FIG. 4 is a perspective view of the stereoscopic analyzer to be used with the invention.

Referring to FIG. 4, the physical arrangement of the stereoscopic analyzer 33 is shown. Stereoscopic analyzer 33 as an eye shield portion 54 which carries a front plate surface 51 which is approximately parallel to the facial plane of the wearer to which it is held by means of headband 52. A cushion or resilient pad surface 55 permits the body of the analyzer 54 to more closely fit the facial contour of the wearer. Additionally, material 55 provides a light-tight seal about the face of the wearer in the vicinity of the eyes and thereby permits increased visual contrast.

A mounting frame 53 is carried on front surface 51 and mounts the electro-optical light valves 27' and 28' in front of the eyes of the wearer. This mounting 53 may include an optical glass surface to protect the individual polarizers and to facilitate the cleaning of accumulated dust and grime.

Additionally, mounting frame 53 may be hingedly affixed to front surface 51 to permit operator 14 to raise the analyzer light-valves 27' and 28' from his visual field. This raised position may be used with a switch, not shown, to lock the beam plitter into either a left or right beam path to provide binocular vision of a monoscopic presentation on monitor 15.

Electrical connection is made to electro-optical light valves 27' and 28' by means of a electrical connector 57 attached to the end of cable 19 which cooperatively engages a suitable electrical socket 56 which is mounted on the stereoscopic analyzer 33. Electrical connector 57 and socket 56 are preferably of the quick disconnect type to facilitate rapid changes of observers and to permit each observer to maintain an individualized stereoscopic analyzer.

A similar electrical quick disconnect arrangement may be used with lorgnette 34, FIG. 2, if desired.

The foregoing discussion while sufficiently complete to enable a person skilled in marine engineering and electro-optical instrumentation arts to assemble the system of the invention, may be more readily appreciated with reference to the following description of the mode of operation.

MODE OF OPERATION

Referring to FIGS. 1, 2 and 4, operation of the invention commences with the launch submarine vehicle 11 and the energization of the power supplies 16 and 17 which provides the propulsion and maneuvering controls for the vehicle. Operator 14 then connects his stereoscopic analyzer 33 to the end of cable 19 by means of connector 57 and socket 56, FIG. 4. Submarine vehicle 11 is then maneuvered with the assistance of the stereoscopic image transmitted by camera arrangement 21 and other navigational instruments at his disposal. Of course, the operation of illumination source 23 may be required to provide adequate image intensity on TV monitor 15 to facilitate maneuvering of submarine vehicle 11.

With the system properly energized TV camera 23 records images from the two convergent stereoscopic paths in synchronism with the frame signals supplied to shutter control logic 29 by TV monitor 15. In this fashion, alternate frames presented on the TV monitor correspond to the left and right eye images received in a normal stereoscopic vision.

It should be noted that movement of the stereoscopic camera 21 occasioned by either independent pan and tilt controls, not shown, or movement of submarine vehicle 11 may result in some $z$ axis modulation in an alternate time frame system as is well understood in the stereo-cinematographic arts. Such $z$ axis modulation, which is highly undesirable in terrestrial systems, has proven of minor consequence in a submarine viewing system where movements are much slower and damped by the underwater environment. This utilization of the full screen of TV monitor 24 for each frame provides increased visual resolution and has proven, in the underwater viewing applications described above, to be a distinctly advantageous trade-off with the aforementioned $z$ axis modulation induced by small camera movements.

The stereoscopic analyzer 33 is synchronized with the optical beam splitter 25 by means of shutter control logic circuit 29 which feeds synchronization signals to stereoscopic analyzer 33 via shutter distribution circuit 32.

Supervisory personnel, or others, wishing to view TV monitor 15 along with operator 14 simply pick up lorgnette viewer 34 which may be conveniently held on the operational console by retaining means, not shown. This combined viewing system has proven highly advantageous in permitting personnel other than operator 14 to participate in the operation system and to view underwater objects.

When the period of underwater observation has been terminated, submarine vehicle 11 is guided back to the surface where it is recovered by suitable deck handling means on vessel 18, not shown. Operator 14, of course, then extinguishes illuminating source 13 and turns off the camera monitoring system.

The foregoing description taken together with the appended claims constitute a disclosure such as to enable a person skilled in the electro-optical and marine engineering arts and having the benefit of the teachings contained therein to make and use the invention. Further, the structure herein described meets the aforestated objects of the invention, and generally constitutes a meritorious advance in the art unobvious to such workers befret of these teachings.

Obviously, many modifications and variations of the present invention are possible in the light of the above teachings. It is therefore to be understood that within the scope of the appended claims the invention may be practiced otherwise than as specifically described.

What is claimed is:

1. An underwater viewing system comprising:
   underwater vehicle means for providing a controllable platform beneath the surface of the water;
   illumination means mounted on said underwater vehicle for lighting a predetermined area about the underwater vehicle;
   camera means connected to said underwater vehicle means in cooperative alignment with said illumination means to photograph the area illuminated thereby;
   readout means effectively connected to said camera means for presenting an operator with a view of the area photographed by said camera means;
   stereoscopic beam-splitter means attached to said camera means for alternate presentation to the camera light from two stereoscopically converging light paths;
   stereoscopic logic circuit means connected to said readout means for receiving synchronizing signals therefrom and connected to said stereoscopic beam-splitter means for supplying control signals thereto to cause the alternation of light paths to occur synchronously with the frame presentation rate of said readout means; and
   stereoscopic analyzer means connected to said stereoscopic logic circuit means for presenting alternate left eye and right eye images to the operator in synchronism with the alternate presentation of light paths to said camera means by said beam-splitter means, whereby the operator may receive a stereoscopic presentation of objects within the area illuminated by said illumination means.

2. An underwater viewing system according to claim 1 in which said stereoscopic beam-splitter means includes electro-optical light valves.

3. An underwater viewing system according to claim 2 in which said electro-optical light valves include nematic liquid crystals.

4. An underwater viewing system according to claim 2 in which said electro-optical light valves include lanthanum modified lead zirconate-titenate ceramic elements.

5. An underwater viewing system according to claim 1 in which said stereoscopic analyzer means includes electro-optical light valve means.

6. An underwater viewing system according to claim 5 in which said electro-optical light valve means include nematic liquid crystals.

7. An underwater viewing system according to claim 5 in which said electro-optical light valve means include lanthanum modified lead zirconate titenate ceramic elements.

8. An underwater viewing system according to claim 6 in which said stereoscopic analyzer means includes:

a front surface in which said electro-optical light valve means are mounted;
   a face engaging portion attached to said front surface configured to conform to the facial contours of a wearer; and
   a head band attached to said face engaging portion and adapted to encircle the head of a wearer and hold the analyzer in operative position.

9. An underwater viewing system according to claim 7 in which said stereoscopic analyzer means includes:

a front surface in which said electro-optical light valve means are mounted;
   a face engaging portion attached to said front surface configured to conform to the facial contours of a wearer; and
   a head band attached to said face engaging portion and adapted to encircle the head of a wearer and hold the analyzer in operative position.

10. An underwater viewing system according to claim 1 in which said stereoscopic analyzer means includes:
- a body-worn, stereoscopic, electro-optical light valve pair;
- a lorgnette stereoscopic light valve;
- a shutter distribution circuit connected to electrically connect said body worn, stereoscopic, electro-optical light valve pair and said lorgnette stereoscopic light valve to said stereoscopic logic circuit means.

11. An underwater viewing system according to claim 10 in which said electro-optical light valve pair includes nematic liquid crystals.

12. An underwater viewing system according to claim 10 in which said electro-optical light valve pair includes lanthanum modified lead zirconate-titenate ceramic elements.

* * * * *